United States Patent
Ballman et al.

(10) Patent No.: US 12,532,896 B1
(45) Date of Patent: Jan. 27, 2026

(54) METHOD OF MAKING MULTI-TEXTURED CONFECTIONERY PIECES

(71) Applicant: General Mills, Inc., Minneapolis, MN (US)

(72) Inventors: Darryl J. Ballman, Wyoming, MN (US); Robert Erickson, Robbinsdale, MN (US); Sahil Gupta, Saint Louis Park, MN (US); Robert J. Risser, Howard Lake, MN (US)

(73) Assignee: General Mills, Inc., Minneapolis, MN (US)

( * ) Notice: Subject to any disclaimer, the term of this patent is extended or adjusted under 35 U.S.C. 154(b) by 941 days.

(21) Appl. No.: 17/734,237

(22) Filed: May 2, 2022

(51) Int. Cl.
*A23G 3/52* (2006.01)

(52) U.S. Cl.
CPC ..................................... *A23G 3/52* (2013.01)

(58) Field of Classification Search
CPC ...................................................... A23G 3/52
See application file for complete search history.

(56) References Cited

U.S. PATENT DOCUMENTS

| | | | |
|---|---|---|---|
| 3,114,639 A | 12/1963 | Rivoche | |
| 3,345,186 A | 10/1967 | Kania et al. | |
| 3,556,812 A | 1/1971 | Krohn et al. | |
| 4,785,551 A | 11/1988 | Meyer | |
| 6,432,460 B1 | 8/2002 | Zeitlow et al. | |
| 2002/0192345 A1 | 12/2002 | Kepplinger et al. | |
| 2004/0109933 A1 | 6/2004 | Roy et al. | |
| 2004/0170751 A1 | 9/2004 | Roy et al. | |
| 2004/0234675 A1 | 11/2004 | Roy et al. | |
| 2006/0034976 A1 | 2/2006 | Cotton et al. | |
| 2010/0330247 A1 | 12/2010 | Montaigne et al. | |
| 2018/0199587 A1 | 7/2018 | Kamper et al. | |
| 2020/0046014 A1 | 2/2020 | Clavier et al. | |
| 2020/0128850 A1* | 4/2020 | Ballman | ................ A23L 7/10 |

FOREIGN PATENT DOCUMENTS

| | | |
|---|---|---|
| EP | 2016836 | 1/2009 |
| EP | 3072581 | 9/2016 |
| WO | WO 2019/209252 | 10/2019 |

* cited by examiner

*Primary Examiner* — Jenna A Watts
(74) *Attorney, Agent, or Firm* — Jordan IP Law, LLC; John L. Crimmins, Esq.

(57) ABSTRACT

Multi-textured confectionery pieces, such as marbits for use in cereal, are prepared by combining particulates with a non-aerated marshmallow slurry to form a pumpable dough/particulate slurry. The pumpable confection/particulate slurry is then combined with a cooled, aerated marshmallow slurry. By first forming the confection/particulate slurry in non-aerated form and then combining with the aerated marshmallow slurry, the resulting combination slurry remains aerated, while the incorporated particulates remain intact. This resulting foam product is then extruded into a desired shape, cut into confectionery pieces and dried, thereby effectively establishing the desired multi-textured confectionery pieces.

20 Claims, 1 Drawing Sheet

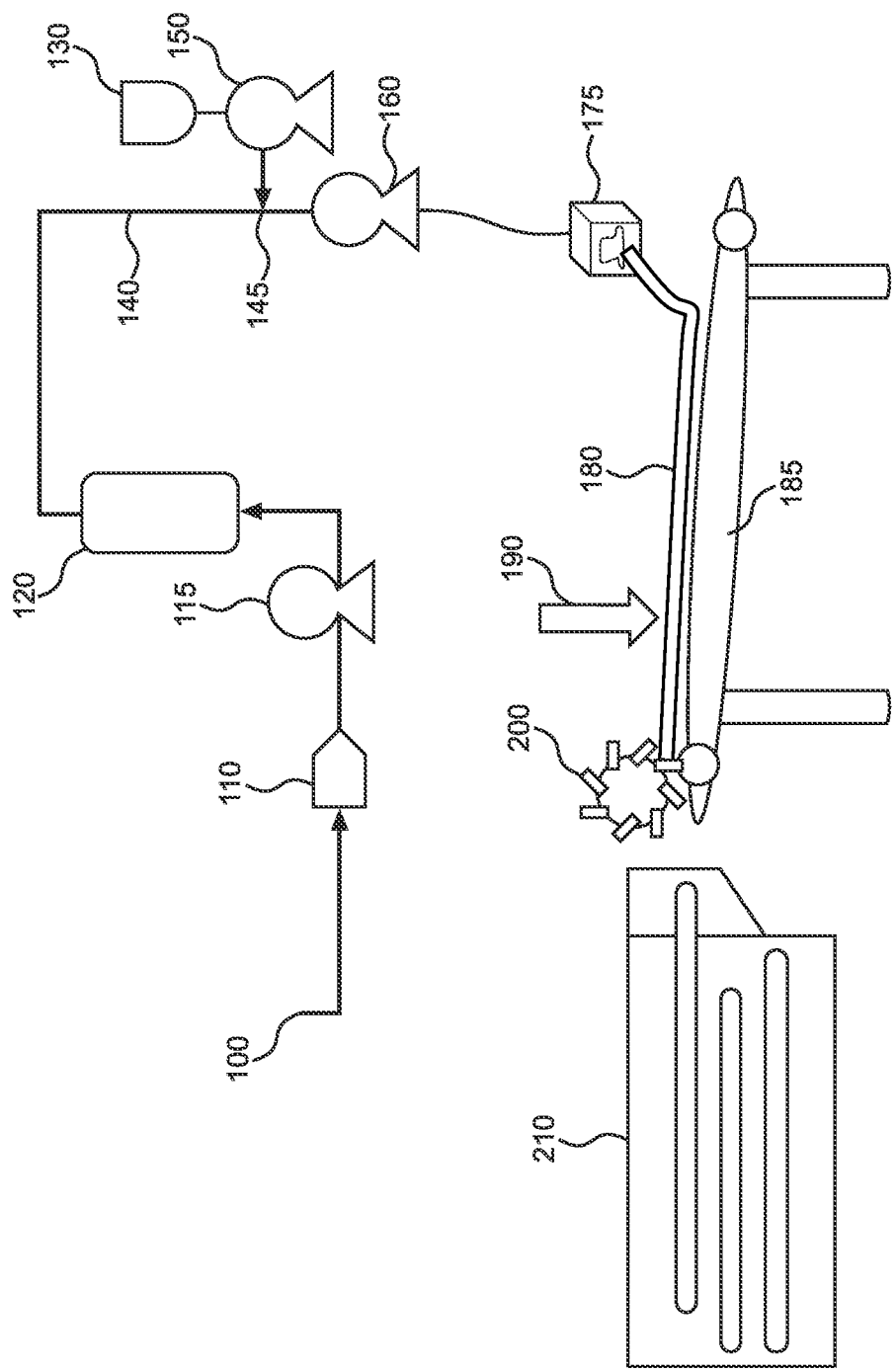

METHOD OF MAKING MULTI-TEXTURED CONFECTIONERY PIECES

FIELD OF THE INVENTION

The invention generally pertains to the making of aerated confectionery products and, more particularly, incorporating particulates in establishing multi-textured confectionery pieces.

BACKGROUND OF THE INVENTION

Aerated confections are popular food items. Some aerated confections comprise a fat constituent while others are substantially free of fat constituents. An illustrative fat-free aerated confection is the common marshmallow. Such marshmallow products are familiar in both larger and smaller sizes. It is well known that marshmallows are soft and pliable when fresh but will stale by losing moisture and become hard. Indeed, purposefully pre-dried aerated confections are also well known. These products, particularly in smaller or bite sizes, are commonly added to certain popular ready-to-eat ("RTE") breakfast cereals, e.g., Lucky Charms® brand RTE cereal. Due to their small size (i.e., generally having a piece count of 3 to 6 per gram), these dried aerated confectionery marshmallow products are sometimes colloquially referred to as "marshmallow bits" or "marbits". Marbits are pre-dried to the low water activity (0.1-0.4) of RTE cereals prior to mixing with other cereal pieces to reduce unwanted moisture migration from the marbits to the other cereal pieces. These dried marshmallow pieces exhibit desirable crisp, frangible eating qualities, with the dried confections being crunchy rather than soft or chewy.

While there are many types of marshmallow products on the market, their methods of preparation generally fall into two main process groups: extruded marshmallow and deposited or starch casing marshmallow. In both types, a sugar syrup, a structuring agent, and a whipping agent are the main ingredients. Often, gelatin is used as both the whipping agent to form an aerated foam as well as the structuring agent for setting the foam. Typically, the sugar syrup is heated to dissolve solids, boiled to reduce moisture, cooled down, and then combined with the gelatin to form a slurry. That slurry is then aerated to form a foam. Optionally, colors and flavors are added to the foam immediately after aeration, although in certain embodiments these adjuvants are added to the syrup prior to aerating. The particular marshmallow product can be formed into its final shape by an extrusion process. That is, after aeration, the foam is extruded through a die to form a rope, with the die imparting the desired peripheral shape to the rope. The rope is generally allowed to rest briefly to set, and it can be dusted or enrobed with starch before being cut into desired sizes. For dried marshmallows, the process can additionally include one or more drying steps. See, for example, U.S. Pat. No. 3,345,186, issued Oct. 3, 1967, and titled "Method of Making A Dehydrated Confection, as well as U.S. Pat. No. 4,785,551, issued Nov. 2, 1988, and titled "Method of Drying Confection Pieces", both of which are incorporated herein by reference.

Consumer food products require constant innovation to maintain popularity. Innovation and change are even more important for those consumer food products oriented towards children. Accordingly, while crisp or frangible dried marshmallow confection pieces suitable for addition to RTE cereals are already popular, it would be desirable to be able to provide dried marshmallow confection pieces having multiple textures to enhance the overall eating experience.

SUMMARY OF THE INVENTION

The invention is directed to producing multi-textured confectionery pieces. More specifically, the invention concerns a particular method for the inclusion of particulates in confectionery pieces, such as marbits. In accordance with the invention, particulates (e.g., alginate-based particulates) are combined with a non-aerated marshmallow slurry to form a pumpable confection/particulate slurry or "dough". The pumpable confection/particulate slurry is then combined with a cooled, aerated marshmallow slurry. By first forming the confection/particulate slurry and then combining with the aerated marshmallow slurry after the marshmallow slurry has been aerated and cooled, the resulting foam product remains surprisingly aerated, while the incorporated particulates remain intact. This resulting foam product is then extruded into a desired shape, cut into confectionery pieces and dried, thereby effectively establishing the desired multi-textured confectionery pieces.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 1 is a schematic of a manufacturing process for the continuous production of multi-textured confection pieces according to the invention.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The FIGURE is just a schematic representation, is not to scale, and some features may be simplified or generalized to just illustrate particular stages or components. Therefore, specific structural and functional details disclosed herein are not to be interpreted as limiting, but merely as a representative basis for teaching one skilled in the art to employ the present invention. In addition, any specific numerical value listed herein includes a margin of error of +/−5%. Accordingly, a mass of 10.0 grams includes masses between 9.50 and 10.5 grams. Similarly, a range of 8.00-12.0 grams includes masses between 7.60 and 12.6 grams. The term "about" increases the margin of error to 10%. For numerical values expressed as percentages, the margin of error refers to the base numerical value. In other words, "about 20%" means 18-22% and not 10-30%.

In general, production of the multi-textured confection pieces according to the invention involves: 1) preparing a non-aerated pumpable confection/particulate slurry; 2) introducing the pumpable confection/particulate slurry into an incoming, aerated and cooled, marshmallow slurry to form an aerated, combination slurry; 3) creating an aerated extrudate from the combination slurry; 4) cutting the extrudate into confectionery pieces; and 5) drying the confectionery pieces to form multi-textured confectionery pieces. The multi-textured confectionery pieces can then be incorporated into food products, such as RTE cereals, cereal bars or other snack products. Preferably, the multi-textured confectionery pieces constitute marbits which are sized to have a piece count of about 3-6 per gram. Although the present invention is not focused on forming the marshmallow slurry which is aerated and cooled prior to blending with the non-aerated pumpable confection/particulate slurry, certain details of these steps are provided below for completeness.

Marshmallows can be produced by a variety of different methods and from a variety of different ingredients depending on the properties desired. In general though, marshmallows comprise a saccharide component, a foaming or whipping component and a structuring component. Typically, on a dry weight basis, marshmallows comprise 50-95% of the saccharide component (preferably 70-90%), 0.05-15% of the foaming or whipping component (preferably 1-4% and most preferably about 2.5%), and 0.5 to 20% of the structuring component (preferably 1-6% and most preferably about 2.5%).

The saccharide component can include disaccharides, such as sucrose; monosaccharides, such as glucose, dextrose and fructose; oligosaccharides; or mixtures thereof. As used herein, an "oligosaccharide" is a molecule containing two to twenty sugar units joined by glycosidic bonds. The soluble fiber inulin and corn syrup are two examples of oligosaccharide-rich ingredients.

The foaming or whipping component can include a protein-based whipping agent, such as soy protein, albumen, sodium caseinate, whey protein, gelatin or mixtures thereof. Suitable non-proteinaceous whipping agents include low molecular weight surfactants (e.g., sodium lauryl sulfate ("SLS"), lecithin), polymers (e.g., methyl cellulose ("MC"), hydroxypropyl methyl cellulose ("HPMC"), propylene glycol alginate ("PGA")) or mixtures thereof.

The structuring component can include gelatin; hydrophilic colloids, such as pectin; modified starches; gums, such as guar and carrageenan; or mixtures thereof. Thus, gelatin can be used as both the foaming and structuring component (and is often the only foaming and structuring agent).

If desired, marshmallows can additionally include one or more ingredients to improve their appearance, flavor, nutritional value and/or other organoleptic attributes.

Generally, the saccharide component is heated to dissolve solids, boiled to reduce moisture, cooled down, and then combined with the foaming and structuring components to form a slurry. That slurry, which is introduced at 100 in the schematic of FIG. 1, is then aerated at 110 to form a foam. Optionally, colors and flavors are added to the foam immediately after aeration, although in certain known arrangements these adjuvants are added prior to aerating. The foam is then directed through a pump 115 (e.g., at about 120-140 psi) to a foam cooling unit 120, with the cooled confection foam being present at 140.

During this operation, a confection/particulate slurry is also prepared at 130. In a preferred form of the invention, particulates, such as alginate-based particulates, are combined with a non-aerated confection slurry, which in one form of the invention is the same slurry present at 100, to create a pumpable confection/particulate slurry, or "dough" given as this slurry is not aerated. At this point, it should be recognized that the percentage of particulates can vary but are preferably provided to establish about a 20-50% suspension and, more preferably, a 20-30% suspension, e.g., 20 grams of particulates to 80 grams of non-aerated confection slurry. Overall, a significant additional volume of slurry is desired to establish a higher liquid content in order to maintain the desired suspension (solids dispersed and suspended in a confectionery body). In addition to the amount of particulates, the type of particulate can vary. Most preferably, the particulates employed do not tend to absorb water (hydrophobic) and can be solid particulates, encased liquids or gels, or a combination thereof. By way of example, the particulates can take the form of grain particulates including chips, candy confections, alginates or an internal liquid or gel encased in an outer shell to present different fruit or other flavors and a burst of flavor when chewed. Overall, the particulates themselves can present different tastes, textures, visual appearance and mouthfeel, while potentially being configured to allow some bleeding of color or flavor.

This pumpable (again, non-aerated for flow purposes) confection/particulate slurry is pumped to be combined with the cooled confection foam from foam cooling unit 120 at 145. For this purpose, a low-shear pump 150 is employed. More specifically, pump 150 preferably constitutes a low-shear positive displacement pump, such as a rotary piston or vacuum assisted multi-screw type pump. In any case, the non-aerated pumpable confection/particulate slurry is combined with the aerated confection slurry or foam to create a combination slurry. Although the ratio for the combination slurry can vary, a preferred embodiment employs a rate of addition of the confection/particulate slurry to the aerated confection slurry of about 1:3. The combination slurry, which itself is aerated, flows to the inlet of a booster pump 160 at about 50-70 psi, with booster pump 160 also preferably constituting a positive displacement pump. Booster pump 160 raises the pressure to about 100 psi and directs the combination slurry to an extruder 175 which creates a shaped extrudate in the form of a rope 180 directed onto a conveyor 185. Rope 180, which has a desired shape as established by extruder 175, is then preferably conveyed under a starch waterfall at 190 and then is cut by cutter 200 to create multi-textured confectionery pieces, such as dual-textured marbits, which are then directed through a drying unit 210. Importantly, the pieces are multi-textured, which means they include two, or perhaps more, different textures, as the particulates remain intact throughout the process described.

At drying unit 210, in the case of making marbits, the multi-textured confection pieces are dried in one or more drying steps to a moisture level that provides a water activity (aw) ranging from 0.1-0.4, preferably 0.15-0.25, throughout the entirety of each resulting marbit (i.e., in the center of each marbit). Products dried to such water activity values are particularly suitable for addition to or use in dry shelf-stable ready-to-eat products, such as RTE cereals, a beverage such as hot chocolate (added either to dry cocoa powders or directly to hot chocolate drink), oatmeal (including instant oatmeal) or other dried products for hot cereals (e.g., hot farina), cereal bar products, granola and health bars, dried fruit bars, candy bars, dry mixes for baked goods and a variety of other snack products. By virtue of their low water activity, the dried marshmallows are also useful as confections per se.

During the drying process, the pieces are not heated to a degree sufficient to cause caramelization of the saccharide component. To cause caramelization, the pieces themselves need to reach a certain temperature, with this temperature being dependent on the ingredients selected, particularly the saccharide component. In other words, a high air temperature alone will not cause caramelization if the pieces are not heated for a duration sufficient to raise their temperature to the caramelization temperature. In one exemplary drying process, the pieces are dried at temperatures in the range of 70-80° C. For purposes of the present invention, drying the pieces does not encompass letting the pieces go stale.

Instead, the drying referred to involves an active step and occurs prior to packaging, distribution and sale. Again, at least in the case of making marbits, this drying can result in multi-textured confection pieces having a water activity in the range of 0.1-0.4.

At this point, the dried, multi-textured confectionery pieces can be packaged or incorporated into a desired food product. As noted above, RTE cereals and cereal bars represent exemplary preferred uses for the multi-textured confectionery pieces of the present invention. As indicated above, the actual percentage and/or formulation of particulates can vary in accordance with the invention to create a wide range of products differing in texture, appearance, taste, mouthfeel, etc. for a consumer. Most importantly, the particulates remain intact through processing and into the final product.

Based on the above, it should be readily apparent that the present invention provides novel dried, multi-textured confectionery pieces, as well as a method of producing such products. While certain preferred embodiments of the present invention have been set forth, it should be understood that various changes or modifications could be made without departing from the spirit of the present invention. In general, the invention is only intended to be limited by the scope of the following claims.

The invention claimed is:

1. A method of preparing multi-textured confectionery food pieces comprising:
supplying an aerated confection slurry;
supplying a non-aerated confection and particulate slurry including particulates suspended in a non-aerated confectionery body;
combining the aerated confection slurry and the non-aerated confection and particulate slurry to establish an aerated, combination slurry;
extruding the combination slurry, creating an extrudate; and
cutting the extrudate into multi-textured, confectionery pieces including the particulates from the non-aerated confection and particulate slurry intact,
wherein the particulates constitute about 20-50% of the non-aerated confection and particulate slurry.

2. The method of claim 1, wherein the particulates constitute about 20-30% of the non-aerated confection and particulate slurry.

3. The method of claim 1, wherein the particulates are hydrophobic.

4. The method of claim 1, wherein the particulates constitute grain particulates, candy confections, alginates, or an internal liquid or gel encased in an outer shell.

5. The method of claim 4, wherein the particulates include an encased flavored liquid or gel.

6. The method of claim 1, wherein supplying the aerated confection slurry constitutes pumping the aerated confection slurry through a cooling unit prior to combining the aerated confection slurry and the non-aerated confection and particulate slurry.

7. The method of claim 1, wherein supplying the non-aerated confection and particulate slurry includes pumping the non-aerated confection and particulate slurry into the aerated confection slurry at a ratio of about 1:3.

8. The method of claim 7, further comprising, after combining the aerated confection slurry and the non-aerated confection and particulate slurry to establish the combination slurry, directing the combination slurry through a pump to an extruder for forming the extrudate.

9. The method of claim 1, further comprising drying the confectionery pieces.

10. The method of claim 9, further comprising adding the confectionery pieces to a dry shelf-stable ready-to-eat cereal product.

11. The method of claim 9, further comprising adding the confectionery pieces for use in a beverage, hot cereal, snack or candy bar, and/or dry mix for a baked good.

12. A method of preparing multi-textured food confectionery pieces comprising:
introducing a non-aerated confection and particulate slurry into an aerated and cooled confection slurry stream to establish an aerated, combination slurry;
extruding the combination slurry into a rope;
cutting the rope into confectionery pieces; and
drying the confectionery pieces, with particulates from the non-aerated confection and particulate slurry dispersed and suspended in a confectionery body, wherein the particulates constitute about 20-50% of the non-aerated confection and particulate slurry.

13. The method of claim 12, wherein the particulates constitute about 20-30% of the non-aerated confection and particulate slurry.

14. The method of claim 12, wherein the particulates are hydrophobic.

15. The method of claim 12, wherein the particulates constitute grain particulates, candy confections, alginates, or an internal liquid or gel encased in an outer shell.

16. The method of claim 12, wherein the non-aerated confection and particulate slurry is introduced by pumping the non-aerated confection and particulate slurry into the aerated and cooled confection slurry stream at a ratio of about 1:3.

17. The method of claim 12, further comprising adding the confectionery pieces to a dry shelf-stable ready-to-eat cereal product.

18. The method of claim 12, further comprising adding the confectionery pieces for use in a beverage, hot cereal, snack or candy bar, and/or dry mix for a baked good.

19. The method of claim 1, wherein the non-aerated confection and particulate slurry is prepared from particulates and a non-aerated confection slurry.

20. The method of claim 19, wherein the aerated confection slurry is prepared from a confection slurry having a first composition and the non-aerated confection slurry has the first composition.

* * * * *